United States Patent
Kalwa et al.

(10) Patent No.: US 9,969,101 B2
(45) Date of Patent: May 15, 2018

(54) METHOD AND DEVICE FOR SPECIFICALLY INFLUENCING THE TECHNOLOGICAL PROPERTIES OF INDIVIDUAL REGIONS OF A SHEET-LIKE MATERIAL, A PRE-COMPACTED MATERIAL NONWOVEN OR A MATERIAL FIBRE CAKE

(75) Inventors: Norbert Kalwa, Horn-Bad Meinberg (DE); Gerhard Stahl, Bad Neuenahr-Ahrweiler (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 1118 days.

(21) Appl. No.: 13/978,076

(22) PCT Filed: Jan. 5, 2012

(86) PCT No.: PCT/EP2012/000039
§ 371 (c)(1),
(2), (4) Date: Aug. 28, 2013

(87) PCT Pub. No.: WO2012/093090
PCT Pub. Date: Jul. 12, 2012

(65) Prior Publication Data
US 2013/0328238 A1   Dec. 12, 2013

(30) Foreign Application Priority Data
Jan. 6, 2011   (EP) .................................. 11000068

(51) Int. Cl.
*B27N 3/06*   (2006.01)
*B27N 3/18*   (2006.01)
(Continued)

(52) U.S. Cl.
CPC .............. *B27N 3/06* (2013.01); *B27K 3/0221* (2013.01); *B27K 3/0285* (2013.01); *B27K 3/08* (2013.01);
(Continued)

(58) Field of Classification Search
CPC ........ B27N 3/06; B27N 3/086; B27N 1/0245; B29C 67/248; B29C 43/006
See application file for complete search history.

(56) References Cited

U.S. PATENT DOCUMENTS 2,206,056 A * 7/1940 Sheesley ................... D21J 1/08
118/122
5,389,148 A * 2/1995 Matsunaga ........... B05B 7/2483
101/119
(Continued)

FOREIGN PATENT DOCUMENTS

| CN | 101468485 | 7/2009 |
| CN | 101544012 | 9/2009 |

(Continued)

OTHER PUBLICATIONS

Chinese Search Report for related CN Application No. 201280009742.X dated Oct. 20, 2014, 4 pages.
(Continued)

*Primary Examiner* — Stella K Yi
(74) *Attorney, Agent, or Firm* — Andrew M. Calderon; Roberts Mlotkowski Safran Cole & Calderon, P.C.

(57) ABSTRACT

A device and a method for specifically influencing the technological properties of individual regions of a sheet-like material are provided, including the following steps: a) fixing the sheet-like material or a pre-compacted material nonwoven or a material fiber cake on a workbench, b) placing at least one applicator on the upper side and/or the underside of the sheet-like material, the material nonwoven (Continued)

or the material fiber cake, c) specifically moving the at least one applicator on the upper side and/or the underside and pressing an improving medium into partial regions of the sheet-like material, the material nonwoven or the material fiber cake in a predetermined amount and under a predetermined pressure, d) optionally, subsequently pressing the pre-compacted material nonwoven or the material fiber cake to form a sheet of the desired thickness.

22 Claims, 6 Drawing Sheets (51) Int. Cl.
B29D 7/01 (2006.01)
B27K 3/02 (2006.01)
B27K 3/08 (2006.01)
B27K 3/10 (2006.01)
E04C 2/16 (2006.01)
B27K 5/06 (2006.01)
B27N 1/00 (2006.01)

(52) U.S. Cl.
CPC .................. B27K 3/10 (2013.01); B27N 3/18 (2013.01); B29D 7/01 (2013.01); E04C 2/16 (2013.01); B27K 5/065 (2013.01); B27N 1/00 (2013.01)

(56) References Cited

U.S. PATENT DOCUMENTS

2003/0024199 A1 2/2003 Pervan et al.
2009/0217869 A1 9/2009 Froehlich et al.
2010/0311854 A1 12/2010 Thiers et al.

FOREIGN PATENT DOCUMENTS

| DE | 20002744 U1 | | 8/2000 |
|---|---|---|---|
| DE | 102007044315 | * | 3/2009 |
| DE | 102007044315 A1 | | 3/2009 |
| DE | 102008034749 B3 | | 1/2010 |
| DE | 102008049132 A1 | | 4/2010 |
| EP | 2241426 | * | 10/2010 |
| EP | 2241426 A1 | | 10/2010 |
| RU | 2109627 | | 4/1998 |
| WO | WO-2009050565 A1 | | 4/2009 |

OTHER PUBLICATIONS

International Preliminary Report on Patentability for Appl. No. PCT/EP2012/000039 dated Jul. 10, 2013, 2 pages.
Written Opinion of the International Searching Authority for Appl. No. PCT/EP2012/000039, 10 pages.
Russian Decision to Grant for the related RU Application No. 2013136550/13(055008) dated Jan. 19, 2016, 7 pages.

* cited by examiner

METHOD AND DEVICE FOR SPECIFICALLY INFLUENCING THE TECHNOLOGICAL PROPERTIES OF INDIVIDUAL REGIONS OF A SHEET-LIKE MATERIAL, A PRE-COMPACTED MATERIAL NONWOVEN OR A MATERIAL FIBRE CAKE

1. Field of the Invention

The invention relates to a method for specifically influencing the technological properties of individual regions of a sheet-like material, in particular a wood material board, a pre-compacted material nonwoven, in particular a wood material nonwoven, or a material fiber cake, in particular a wood fiber cake, and to a device for carrying out the method.

2. Discussion of Background Information

Certain wood material boards sometimes have to meet the requirements that they have improved technological properties in comparison with a customary standard wood material board. These improved technological properties often only have to apply partially, that is to say only in individual regions of the wood material board. It is therefore not necessary to modify the entire board, which is often unacceptable for reasons of cost or else not even possible in the process for manufacturing the board. One reason for this may be that a means for modification cannot be used in the manufacture of the board, because for example it has a lasting influence or adverse effect on the manufacturing process. The properties to be modified may be electrical variables (volume resistance), mechanical strengths (for example cross-sectional tensile strength), hydraulic properties (water absorption, swelling) or emission. These examples can be added to as desired to include any application or any associated modification. These properties may relate to the entire processing or application spectrum. They do not have to be physical properties but may also be chemical properties, which for whatever reasons always have to satisfy the wishes of the processor or the user after the manufacture of the board.

These wood material boards are manufactured in large formats from wood chips or wood fibers that are coated with glue and pressed together. These large-format wood material boards are subsequently divided up into individual boards of the desired size. The upper side and/or underside may first have been coated in some kind of form. The divided-up boards may be used as wall, ceiling or floor panels, as furniture panels, partitions or for example as formwork boards, and undergo special subsequent processing for this purpose. The manufacturer or the processor of the large-format wood material board is usually aware which formats are manufactured from a standard board in the course of further processing. The reason for this is that either the manufacturer itself carries out the improvement or there is close contact between the board manufacturer and the further processor. It has been found that the modifications of the technological properties are generally required in the outer region of blanks or cut-to-size pieces. One problem that can be identified here however is that of a required variability that is used for the various formats. This can be solved by a method of treating the wood material boards that is as flexible as possible. If this is ensured, the specific modification of properties in these defined regions is an easy matter.

DE 10 2008 034 749 B3 discloses a wood material board of increased strength in the outer region in comparison with the inner region.

DE 10 2008 049 132 A1 discloses a method for manufacturing a wood fiber board in which first a fiber nonwoven is compressed to form an unfinished wood fiber board, subsequently an aqueous liquid is applied to parts of a first side of the unfinished wood fiber board and subsequently a negative pressure is applied on the second side, opposite from the first side, at least on parts of the second side opposite from the first side, so that the aqueous liquid is sucked into and/or through the unfinished wood fiber board. The application of the aqueous liquid and the application of the negative pressure may take place after the pressing, in particular after a hot pressing operation.

European patent application 09005468.5-1253, which is not a prior publication, describes that, for the manufacture of a wood material board, the cake made up of spread glue-coated wood chips or wood fibers is exposed to a vacuum on a conveyor belt downstream of a prepress and upstream of the hot press, and at the same time an improving medium is applied to the cake and is distributed in the cake as a result of the vacuum, and that the improving medium is cross-linked during the subsequent compressing in the hot press. The vacuum is applied underneath the cake and the improving medium is applied from above.

DE 10 2007 044 315 A1 discloses a device for improving wood material boards that has a receptacle with a bearing surface for bearing a wood material board, and a suction device for applying a negative pressure to a surface of the wood material board that lies on the bearing surface. The suction device comprises a number of suction bars, which at least over a certain section run in a straight line, have seals on their side facing the bearing surface and are designed such that they form with a wood material board lying on the bearing surface an evacuable suction chamber, which has a suction surface facing the wood material board.

In the case of the methods explained above, there is a restriction to the maximum negative pressure that is available. The difficult sealing-off of the system means that the effectiveness for specifically influencing the technological properties is low.

SUMMARY OF THE INVENTION

On the basis of this problem, it is intended to provide a method with which the technological properties of individual regions of a sheet-like material, in particular of wood material board or the like, can be specifically influenced, and to provide as device with which the method can be carried out.

To solve the problem, a method with the following steps is proposed:
a) fixing the sheet-like material or a pre-compacted material nonwoven or a material fiber cake on a workbench,
b) placing at least one applicator on the upper side and/or the underside of the sheet-like material, the material nonwoven or the material fiber cake,
c) specifically moving the at least one applicator on the upper side and/or the underside and pressing an improving medium into partial regions of the sheet-like material, the material nonwoven or the material fiber cake in a predetermined amount and under a predetermined pressure,
d) optionally, subsequently compressing the pre-compacted material nonwoven or the material fiber cake to form a sheet of the desired thickness.

With this method and by means of a combined applying and pressure-impregnating device, partial treatments can be carried out at any desired locations of large-format boards, in the surface or the entire board cross section. For this purpose, the applicator may be guided over the upper side and/or underside with preference over paths of any desired form. The term improving medium should be understood as meaning those media that influence the physical or chemical properties of the sheet-like material. They may be liquid or gaseous. They may subsequently crosslink or bond in some other way with the material, the fibers or the chips. The improving medium may be of different concentrations. The pressure with which the improving medium is forced through the material can be freely chosen. It must just be ensured that the material is not damaged. Increasing the pressure in any event leads to a reduction in the time that is necessary for the improving medium to be forced through the material. The applied pressure may be restricted in the upward sense for economic reasons.

The at least one applicator is preferably sealed off with respect to the upper side and/or underside of the sheet-like material, the material nonwoven or the material fiber cake. The improving medium may be sprayed under pressure by means of at least one application nozzle onto the upper side and/or underside of the sheet-like material, the material nonwoven or the material fiber cake and then penetrate into the sheet-like material, the material nonwoven or the material fiber cake.

The improving medium may, however, also be applied to the upper side and/or underside of the sheet-like material, the material nonwoven or the material fiber cake by means of at least one application nozzle surrounded by a housing, the housing resting in a sealing manner on the upper side and/or the underside of the sheet-like material, the material nonwoven or the material fiber cake and the housing being subjected to positive pressure and the improving medium thereby penetrating into the sheet-like material, the material nonwoven or the material fiber cake. The improving medium may in this case first be applied substantially without any pressure and only then the pressure inside the housing increased. However, it is also similarly conceivable to put the housing under pressure and then spray the improving medium on.

The partially improved sheet-like material may subsequently be divided up into individual, preferably rectangular single sheets. In principle, any peripheral contour is conceivable for the operation of dividing up into single sheets.

In particular, if a pre-compacted material nonwoven or a material fiber cake is to be treated, it is advantageous if a frame, in which a plurality of application nozzles are arranged, is pressed onto the upper side. The application nozzles may preferably be provided on a plurality of bars which are arranged parallel to one another and may be connected to one another by way of connecting crosspieces.

When the frame is pressed onto the upper side of the material nonwoven or the material fiber cake, it is advantageous if the material nonwoven or the material fiber cake is supported on its underside. It is also particularly advantageous if the material nonwoven or the material fiber cake is also laterally supported.

Particularly if isocyanates are used as the improving medium, it is advantageous if at least the underside of the sheet-like material is cleaned after the pressing-in of the improving medium or after the compressing of the improved pre-compacted material nonwoven or material fiber cake.

For reasons of environmental protection and reducing the manufacturing costs, it is advantageous if improving medium escaping on the underside of the material nonwoven or the material fiber cake is collected and carried away. The carried-away improving medium can then be used again.

The collecting and carrying away of the improving medium preferably takes place by means of a perforated plate or a screen.

In order to make the penetration of the sheet-like material with the improving medium and also optionally the collection of the improving medium for, reuse more effective and quicker, a negative pressure may be applied to the underside of the sheet-like material during and/or after the pressing-in of the improving medium.

The negative pressure may be varied in its intensity and/or its variation over time.

The total amount of improving medium is preferably applied in one application. It may, however, also be applied in a number of small partial amounts, that is to say in a number of working steps.

It is particularly advantageous if the positive pressure with which the improving medium is applied is kept constant. However, it is also possible to set the positive pressure with a predetermined gradient, the gradient preferably being increasing.

The device for specifically influencing the technological properties of individual regions of a sheet-like material is distinguished in a first embodiment by the following features:
   a) a workbench, on which a sheet-like material, a pre-compacted material nonwoven or a material fiber cake can be placed and can be fixed,
   b) an applicator with:
      i) a housing, which can be sealed off with respect to the surface of the sheet-like material, the material nonwoven or the material fiber cake,
      ii) at least one application nozzle, arranged in the housing, for applying an improving medium to the surface,
      iii) a pressure generator for generating a positive pressure, by means of which the improving medium can be pressed into the sheet-like material, the material nonwoven or the material fiber cake,
   c) optionally, a compression press for compressing the material nonwoven or the material fiber cake to form a sheet of the desired thickness.

The housing preferably has a seal on its periphery facing the surface of the sheet-like material, the material nonwoven or the material fiber cake.

The device for specifically influencing the technological properties of individual regions of a sheet-like material is distinguished in a second embodiment by the following features:
   a) a workbench, on which a pre-compacted material nonwoven or a material fiber cake can be placed and can be fixed,
   b) an applicator with:
      i) a frame, which can be pressed onto the upper side of the material nonwoven or the material fiber cake,
      ii) a plurality of application nozzles arranged in the frame,
      iii) a pressure generator for generating a positive pressure, by means of which the improving medium can be pressed into the material nonwoven or the material fiber cake,
   c) a perforated plate or screen, arranged within the workbench, for collecting and carrying away improving medium escaping on the underside of the material nonwoven or the material fiber cake, d) a compression press for compressing the material nonwoven or the material fiber cake to form a sheet of the desired thickness.

A supporting device, which acts on the underside of the material nonwoven or the material fiber cake when the frame is pressed onto the upper side is preferably arranged on the workbench.

The supporting device may particularly be preferably formed by the perforated plate or the screen.

It is advantageous if a device which laterally supports the material nonwoven or the material fiber cake is provided on the workbench.

In the case of both embodiments, the pressure generator may be arranged upstream of the at least one application nozzle and press the improving medium through the application nozzle with positive pressure.

However, it may also be that, by way of the pressure generator, the pressure can be increased in the housing resting in a sealing manner on the surface of the sheet-like material, the material nonwoven or the material fiber cake according to the first embodiment.

In order to be able to produce almost any desired pattern of treated zones on the surface, the applicator according to the first embodiment is preferably arranged on an arm that can be guided over the workbench in at least two degrees of freedom.

The housing of the applicator preferably takes the form of a bell.

The device advantageously has a negative pressure generator, so that a negative pressure can be applied to the underside of the sheet-like material, the material nonwoven or the material fiber cake, so that the improving medium is not only pressed into the sheet from above, but is also sucked through the sheet from below.

In a third embodiment, the device for specifically influencing the technological properties of individual. regions of a sheet-like material is distinguished by the following features:
  a) a workbench, on which a sheet-like material, a pre-compacted material nonwoven or a material fiber cake can be placed and can be fixed,
  b) an applicator with:
    i) an upper plate with channels provided therein, which can be placed onto the upper side of the sheet-like material, the material nonwoven or the material fiber cake,
    ii) a plurality of application nozzles, arranged in the channels, for applying an improving medium to the surface,
    iii) seals, which seal off the region of the channels with respect to the remaining regions of the upper plate,
    iv) a pressure generator for generating a positive pressure, by means of which the improving medium can be pressed by way of the application nozzles into the sheet-like material, the material nonwoven or the material fiber cake,
    v) a lower plate with channels provided therein, which can be placed onto the underside of the sheet-like material, the material nonwoven or the material fiber cake,
    vi) seals, which seal off the region of the channels with respect to the remaining regions of the lower plate,
    vii) a negative pressure generator, by means of which the improving medium can be sucked by way of the channels in the lower plate through the sheet-like material, the material nonwoven or the material fiber cake,
  c) optionally, a compression press for compressing the material nonwoven or the material fiber cake to form a sheet of the desired thickness.

The channels in the lower plate are preferably arranged mirror-invertedly in relation to the channels in the upper plate.

It is particularly advantageous if the application nozzles in the channels in the upper plates can be individually activated. The individual activation of the application nozzles may take place by way of a metering system.

Also provided with preference is at least one cylinder, by means of which pressure can be exerted on the plates lying against the sheet-like material, the material nonwoven or the material fiber cake.

It is advantageous if this at least one cylinder is a component part of a press.

BRIEF DESCRIPTION OF THE DRAWINGS

Exemplary embodiments of the invention are to be described in more detail with the aid of a drawing, in which.

DETAILED DESCRIPTION OF THE PRESENT INVENTION

In the following, for the most part reference is not made to a sheet-like material but merely to a wood material board. The synonymous use of these two terms serves for nothing other than better readability. Both the method according to the invention and the device according to the invention are suitable for manufacturing or processing not only wood material boards, for example of MDF, HDF, OSB or multiplex, but also other sheet-like materials, such as for example solid wood boards or boards of cement chip or paperboard. Apart from purely wood materials, a large number of materials, such as for example cement chip or cellulose, also come into consideration as the material for the material nonwoven or the material fiber cake.

Figure 1:
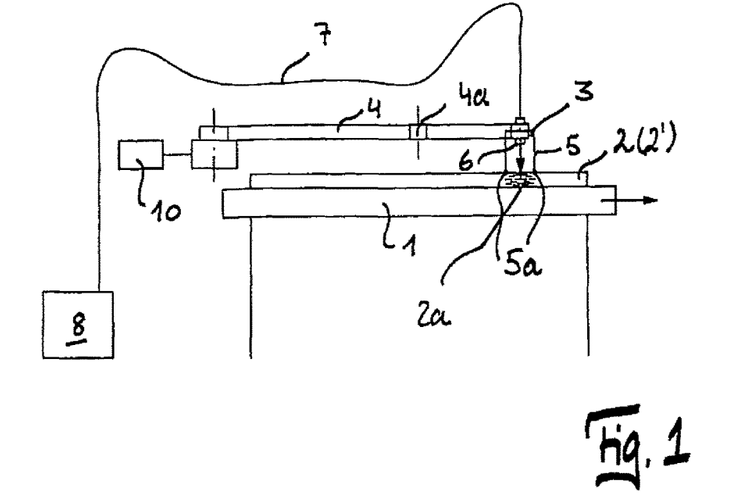
FIG. 1 shows the schematic side view of a first device for specifically influencing the technological properties of individual regions of a sheet-like material.
Figure 2:
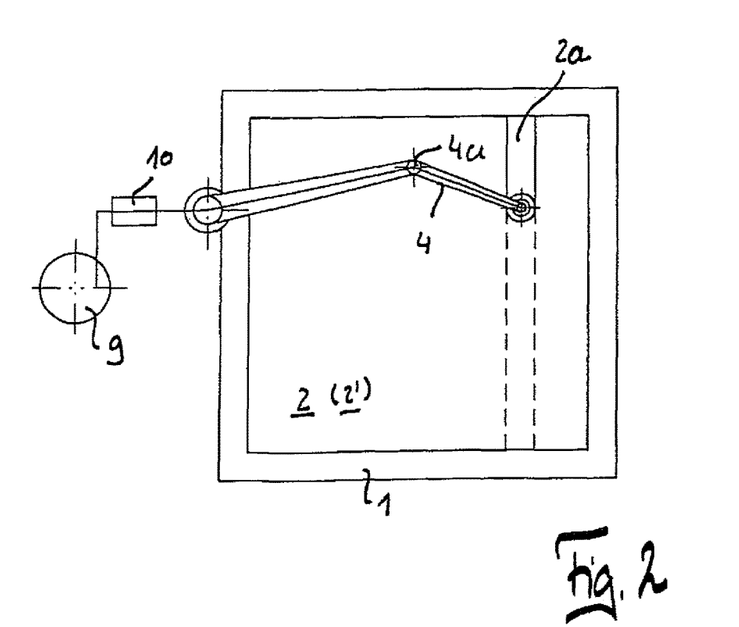
FIG. 2 shows the plan view of the device that is shown in FIG. 1.

The device according to the invention consists of the workbench 1, on which a wood material board 2, a pre-compacted wood material nonwoven 2' or an at least partially pre-compacted wood fiber cake 2' can be placed and fixed, and the applicator 3, which can be moved over the workbench 1 in two degrees of freedom by way of an arm 4. If a wood material nonwoven 2' or a wood fiber cake 2' are treated, the device according to the invention also comprises a high-pressure press 16, in which after the improvement the nonwoven made up of chips coated in a known way with glue or the cake made up of fibers coated in a known way with glue are compressed under high pressure and at a high temperature to form a wood material board 2 of the desired thickness. The high-pressure press 16 may be a customary single- or multi-daylight press or a continuous press. The wood material or the wood fibers are first spread onto an endlessly circulating conveyor belt 19 by means of a spreading device 17 and then pre-compacted in a press 18 to form a nonwoven or cake 2'. For reasons of simplification, in the description which follows only the term wood material board 2 is used for the material that is to be influenced in its technological properties.

The applicator 3 consists of the bell-shaped housing 5 and the at least one nozzle 6, which is arranged inside the housing 5 and is connected by way of a hose 7 to a feed pump 8, which feeds improving liquid from a tank 9. The arm 4 consists of two parts, which are connected to one another by way of a link 4a. The arm 4 is part of a computer-controlled robot 10 that is not represented any more specifically here.

Provided at the lower periphery of the housing 5 is a seal 5a, which rests on the surface of the wood material board 2 and, acting together with the wood material board 2, seals off the interior of the housing 5 from the surroundings. By way of the feed pump 8, an improving liquid can be sucked out from the storage tank 9 and sprayed with positive pressure by way of the nozzle 6 onto the upper side of the wood material board 2, and then penetrates into the interior of the wood material board 2 as a result of the pressure. A pressure unit that is not represented any more specifically, and may for example also be integrated in the feed pump 8, may be provided for this purpose. The applicator 3 is guided over the wood material board 2 by means of the arm 4 in curves following any desired path, so that a region 2a that is improved at least in its technological properties with respect to the remaining wood material board 2 is obtained as a result of the improving liquid that has penetrated into the wood material board 2. The sealing-off of the housing 5 with respect to the wood material board 2 is not absolutely necessary in the case of this exemplary embodiment, but offers the advantage that the improving medium does not spray out from the housing 5.

Figure 3:
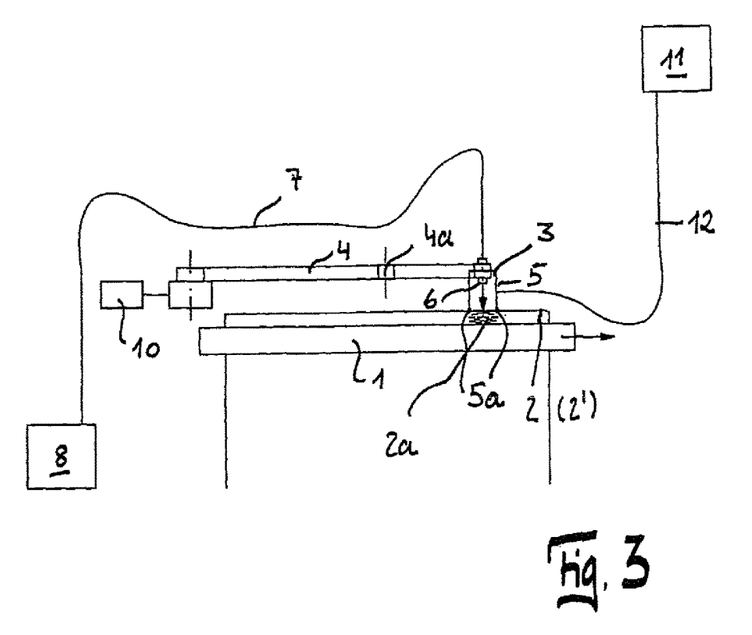
FIG. 3 shows the schematic side view of a further device for specifically influencing the technological properties of individual regions of a sheet-like material.

By contrast, the sealing-off of the housing 5 is imperative in the exemplary embodiment that is represented in FIG. 3.

By way of a pressure unit 11, which is connected by way of a hose 12 to the interior of the housing 5, positive pressure can be built up in the housing 5 once the improving medium has been sprayed onto the upper side of the wood material board 2 by way of the nozzle 6. The improving liquid is then pressed into the interior of the wood material board 2 by the positive pressure that has built up inside the housing 5. It is similarly conceivable that the positive pressure is built up in the housing 5 before improving liquid is sprayed on by way of the feed pump 8. The feed pressure of the feed pump 8 must then be correspondingly higher. By way of the pressure unit 11, ambient air or other gas can be pressed on its own or together with an improving liquid into the wood material board 2. By way of the pressure, an exact metering of the preparation that is intended to be introduced into the board 2 is possible.

As described above, both the upper side and the underside of the wood material board may be treated. This may take place at the same time or in steps. The type of treatment (amount per square meter, width and depth) is in this case substantially predetermined by the application rate of the improving medium, the advancing speed of the applicator 3 and the width of the seal 5a or the inner circumference of the housing 5. According to requirements, this can be varied as desired in the product or in the process. It goes without saying that, in the case of this method, the saving of production means is a significant aspect.

The application rate may be varied according to requirements within a wide range. This depends very much on the sheet thickness and the type of treatment that is desired (superficial, partial or complete impregnation). It may begin with a few grams and be up to 1-2 kg/m$^2$. One particular advantage of the method is that, in the impregnation/treatment of the sheets, the application rates in the application paths can be varied as desired. In this way, properties that are pronounced to differing degrees can be achieved later at the various edges on blanks or finished products. The production of specific desired properties on wood material boards in the surface or outer region has always played a great role in the manufacture and further processing of boards. Examples of this are the specific improvement of the closedness of the boards for postforming applications, in order to deal better with the problem of an uneven edge, the specific treatment of board edges or profiles by means for hydrophobing or producing a better conductivity of profiled boards for subsequent powder coating.

To make the quality of the treatment more easily visible, the media used for this may be colored. This is the easiest possible way of keeping a check on the impregnation. Other possibilities may of course be chosen as required. For example, the check may be detected by way of sensors.

Figure 4:
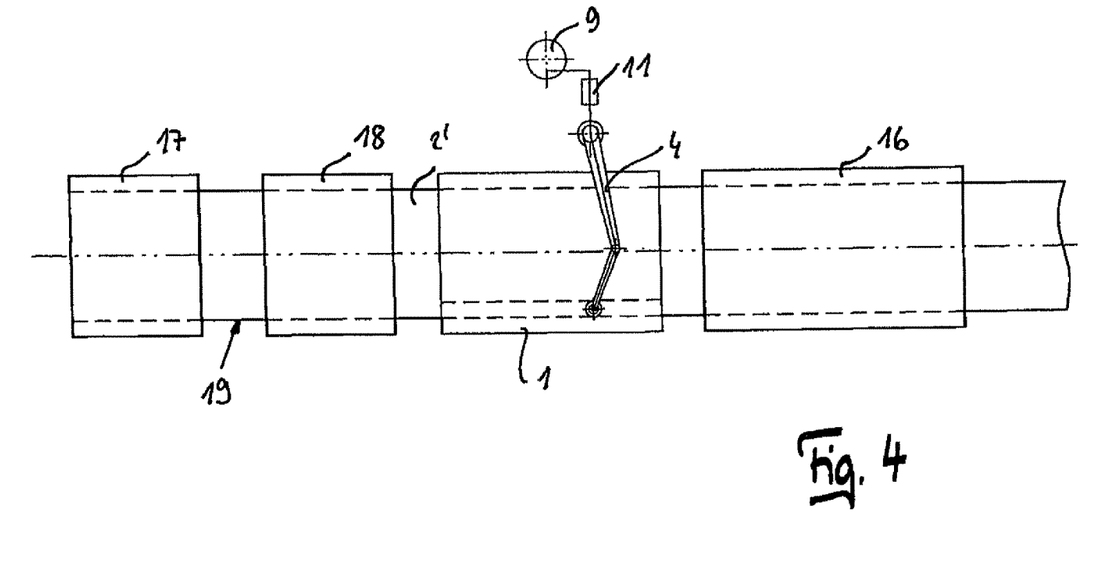
FIG. 4 shows the schematic plan view of an installation for treating a material nonwoven or a material sheet in a first embodiment.

Instead of the bell-shaped housing 5, a complete frame 13, which is pressed onto the upper side of the wood material board 2, may also be used.

Figure 5:
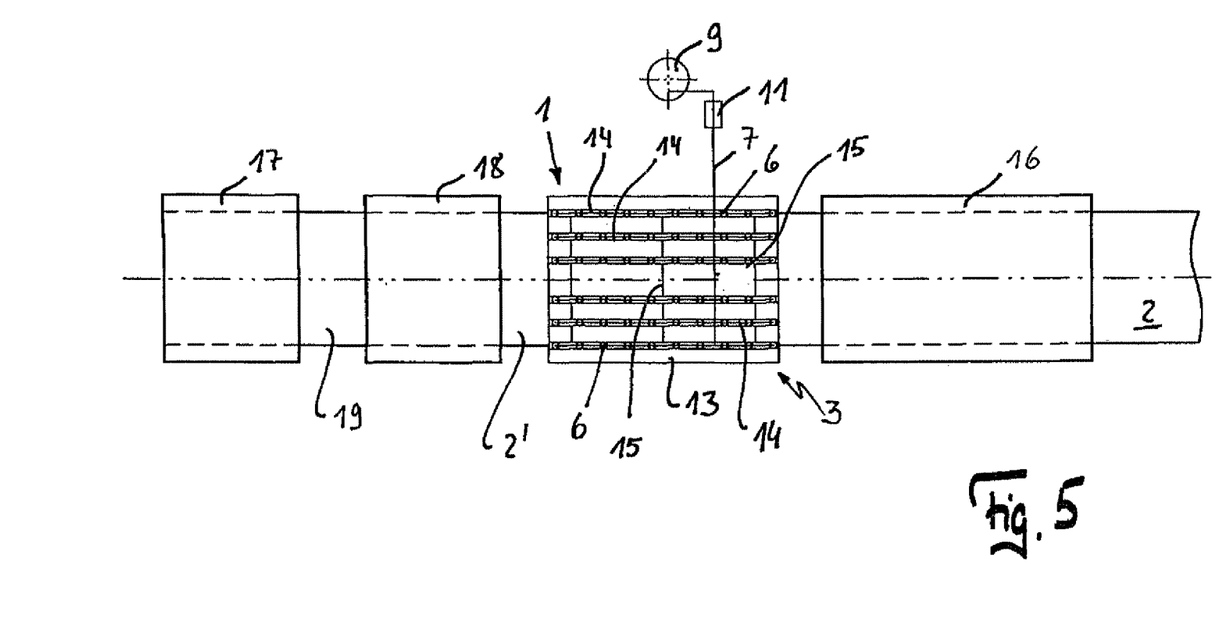
FIG. 5 shows the schematic, plan view of an installation for treating a material nonwoven or a material sheet in a second embodiment.

Provided in the frame 13 are a plurality of application nozzles 6, which are fastened multiply one behind the other on a bar in each case. As FIG. 5 shows, a number of bars 14 are provided spaced apart from one another in parallel and connected to one another by way of connecting crosspieces 15. It is advantageous to use such a frame 13 as an applicator 3 for the treatment of a pre-compacted wood material nonwoven 2' or a wood fiber cake 2'. For this purpose, it is then provided that a supporting device, which acts on the underside of the wood material nonwoven 2' or the wood fiber cake 2' when the frame 13 is pressed onto the upper side, is provided within the workbench 1.

In order to be able to collect and carry away the improving medium escaping on the underside of the wood material nonwoven 2' or the wood fiber cake 2', a perforated plate or screen is arranged within the workbench 1. This perforated plate or screen may also serve as a supporting device. It is advantageous if a device for supporting the wood material nonwoven 2' or the wood fiber cake 2' is also laterally provided on the workbench 1. A frame 13 with a large number of nozzles 6 has the advantage over a housing 5 that a large number of different regions can be improved quickly in a single operation. In order to be correspondingly flexible, the number of application nozzles 6 can be chosen to be correspondingly high. The choice of regions to be improved is then made by activating only individual application nozzles 6.

Figure 6:
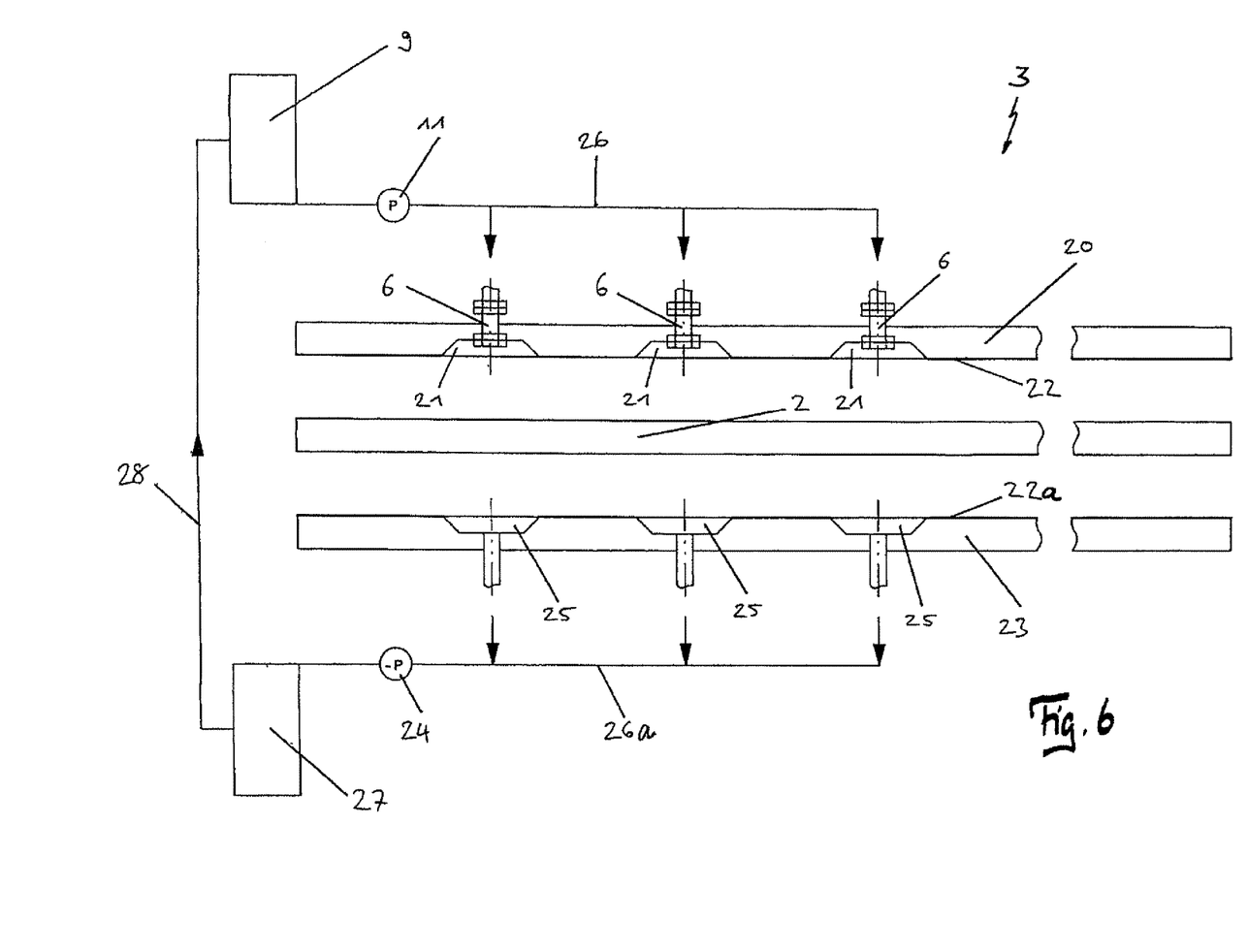
FIG. 6 shows the schematic side view of a device for specifically influencing the technological properties of individual regions of a sheet-like material in a third embodiment in the opened state.

FIG. 6 shows a further exemplary embodiment of a device according to the invention in a side view. The upper plate 20 has a plurality of channels 21, in which in turn a plurality of application nozzles 6 are arranged at regular intervals. By means of the application nozzles 6, various substances, for example an improving liquid which is stored in the storage tank 9, can be applied to the wood material board 2. In this case, the improving medium may undergo variable pressurization with compressed air by means of the pressure generator 11 connected upstream of the application nozzles 6. The upper plate 20 has seals 22, which close off the region of the channels 21 from the remaining region of the plate. On the lower plate 23, opposite from the upper plate 20, there are channels 25 that are arranged mirror-invertedly in relation to the upper channels 21 and are connected to a negative pressure generator 24. The lower plate 23 has in the region of the channels 25 seals 22a, which seal off the region of the lower channels 25 from the remaining region of the plate.

By means of a pressing device, pressure can be exerted on the upper plate 20 and on the lower plate 23, so that good sealing-off is obtained.

The negative pressure generated by the negative pressure generator 24 can be varied in its intensity and in its variation over time. Similarly, the nozzles 6 in the channels 21 can be individually activated. In this way, allowance can be made for the material-specific requirements and the desired properties of the end product.

The negative pressure generator 24 is connected by way of lines 26a to a collecting tank 27, in which the sucked-off improving liquid is collected. The collecting tank 27 is in turn connected by way of a return line 28 to the storage tank 9.

Figure 7:
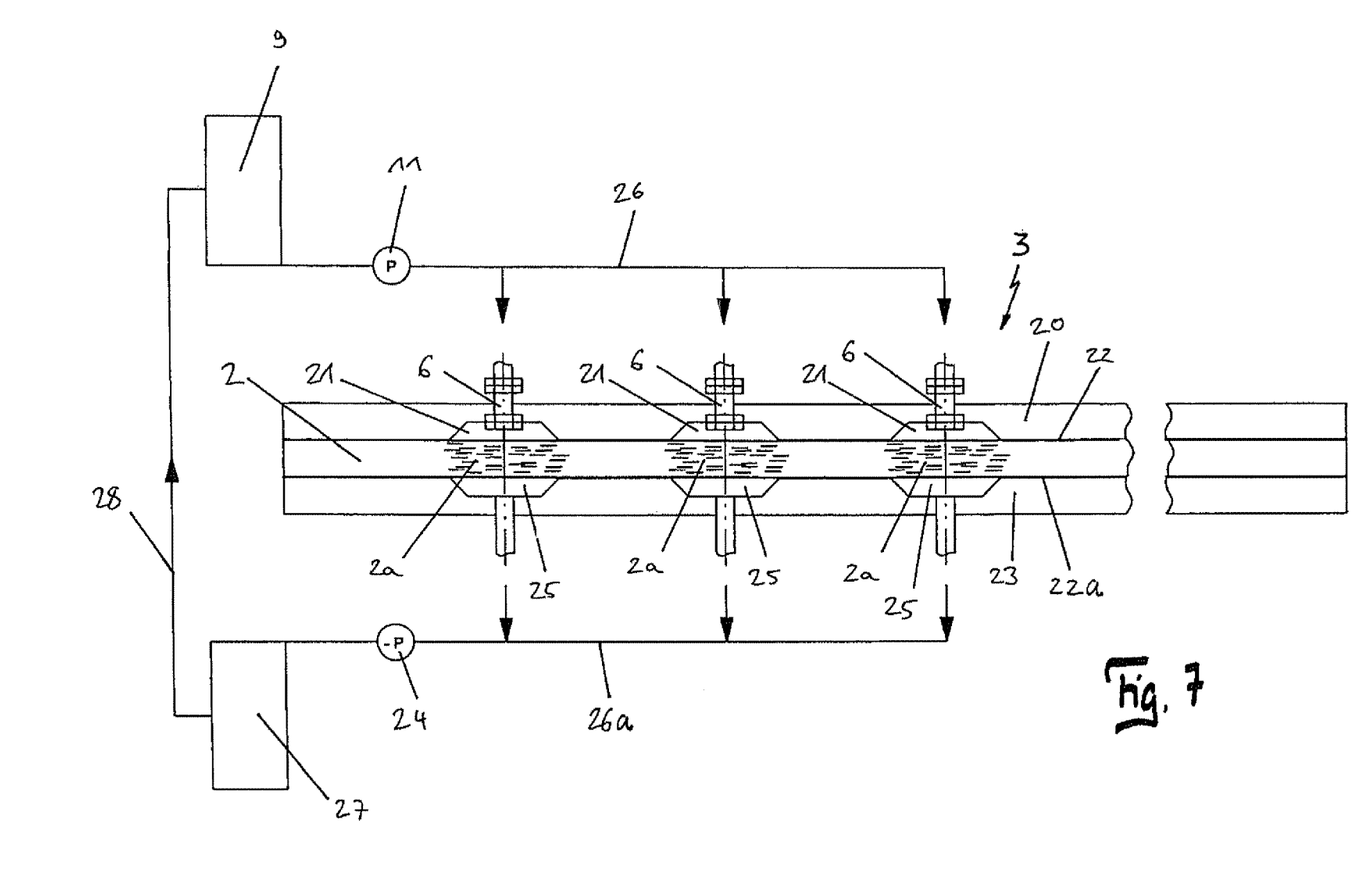
FIG. 7 shows the schematic side view of the device that is shown in FIG. 6 in the closed state.

In order to treat a wood material board 2 according to the invention, it is positioned between the upper and lower plates 20, 23. Subsequently, the pressing device is closed. The then closed state of the device is represented in FIG. 7. Next, a defined amount of a substance, for example an improving liquid, is applied by means of the application nozzles 6 from the storage tank 9 by way of the lines 26 to the wood material board 2. It is possible here for the application of the total amount to take place in one working step or in a number of working steps, that is to say in small partial amounts. At the same time, a negative pressure may be applied to the underside of the wood material board 2. The application of the improving liquid may take place at a pressure that is provided by the pressure generator 11 and may be constant or variable over time. After that, further compressed air may be applied to the upper side of the wood material board 2 over a defined time period, which may likewise be constant over time, for example increasing in accordance with a gradient or progressing over pressure stages, in order to speed up the impregnation of the substance into the wood material board 2.

The improving liquid is thereby introduced effectively into the region 2a of the wood material board 2 in which an improvement is intended. The upper plate 20 and the lower plate 23 may be designed as desired, according to the required impregnation, each channel 21 in the upper plate 20 being opposed by a corresponding channel 25 in the lower plate 23. In this case, the regions 2a to be improved in the wood material board 2 can be determined by the geometry of the channels 21, 25. The application nozzles 6 can be individually activated, whereby special board-specific features, such as for example differences in apparent densities and geometries of profiles, can be taken into consideration.

If it is advantageous for handling, the upper plate 20 and the lower plate 23 may also be replaced by frame systems without any changes to the functional principle.

The invention claimed is:

1. A method for influencing the technological properties of individual regions of a sheet-like material comprising:
    a) fixing the sheet-like material or a pre-compacted material nonwoven or a material fiber cake on a workbench,
    b) placing at least one applicator on an upper side and/or the underside of the sheet-like material, the material nonwoven or the material fiber cake,
    c) specifically moving the at least one applicator on the upper side and/or the underside and pressing an improving medium into partial regions of the sheet-like material, the material nonwoven or the material fiber cake in a predetermined amount and under a predetermined pressure, and
    d) optionally, subsequently compressing the pre-compacted material nonwoven or the material fiber cake to form a sheet of the desired thickness,
    wherein a negative pressure is applied to the underside of the sheet-like material during the pressing-in and/or after the pressing-in of the improving medium.

2. The method as claimed in claim 1, wherein the at least one applicator is sealed off with respect to the upper side and/or underside of the sheet-like material, the material nonwoven or the material fiber cake.

3. The method as claimed in claim 1, wherein the at least one applicator is guided over the upper side and/or underside over paths of any desired form.

4. The method as claimed in claim 2, wherein the improving medium is sprayed under pressure by means of at least one application nozzle onto the upper side and/or underside of the sheet-like material, the material nonwoven or the material fiber cake and penetrates into the sheet-like material, the material nonwoven or the material fiber cake.

5. The method as claimed in claim 2, wherein the improving medium is applied to the upper side and/or underside of the sheet-like material, the material nonwoven or the material fiber cake by means of at least one application nozzle surrounded by a housing, in that the housing rests in a sealing manner on the upper side and/or the underside of the sheet-like material, the material nonwoven or the material fiber cake and positive pressure is introduced into the housing and the improving medium thereby penetrates into the sheet-like material, the material nonwoven or the material fiber cake.

6. The method as claimed in claim 4, wherein a partially improved sheet-like material is divided up into individual, rectangular single sheets.

7. A method for influencing the technological properties of individual regions of a sheet-like material comprising:
    a) fixing the sheet-like material or a pre-compacted material nonwoven or a material fiber cake on a workbench,
    b) placing at least one applicator on an upper side and/or the underside of the sheet-like material, the material nonwoven or the material fiber cake,
    c) specifically moving the at least one applicator on the upper side and/or the underside and pressing an improving medium into partial regions of the sheet-like material, the material nonwoven or the material fiber cake in a predetermined amount and under a predetermined pressure, and
    d) optionally, subsequently compressing the pre-compacted material nonwoven or the material fiber cake to form a sheet of the desired thickness,
    wherein the at least one applicator is sealed off with respect to the upper side and/or underside of the sheet-like material, the material nonwoven or the material fiber cake, and
    wherein the improving medium is sprayed under pressure by means of at least one application nozzle onto the upper side and/or underside of the sheet-like material, the material nonwoven or the material fiber cake and penetrates into the sheet-like material, the material nonwoven or the material fiber cake, and further comprising a frame, in which a plurality of the application nozzles are arranged, is pressed onto the upper side of the material nonwoven or the material fiber cake.

8. The method as claimed in claim 7, wherein the plurality of application nozzles are provided on a plurality of bars arranged parallel to one another.

9. The method as claimed in claim 7, wherein, when the frame is pressed onto the upper side, the material nonwoven or the material fiber cake is supported on its underside.

10. The method as claimed in one of claim 7, wherein improving medium escaping on the underside of the material nonwoven or the material fiber cake is collected and carried away.

11. A method for influencing the technological properties of individual regions of a sheet-like material comprising:
 a) fixing the sheet-like material or a pre-compacted material nonwoven or a material fiber cake on a workbench,
 b) placing at least one applicator on an upper side and/or the underside of the sheet-like material, the material nonwoven or the material fiber cake,
 c) specifically moving the at least one applicator on the upper side and/or the underside and pressing an improving medium into partial regions of the sheet-like material, the material nonwoven or the material fiber cake in a predetermined amount and under a predetermined pressure, and
 d) optionally, subsequently compressing the pre-compacted material nonwoven or the material fiber cake to form a sheet of the desired thickness, wherein:
 the at least one applicator is sealed off with respect to the upper side and/or underside of the sheet-like material, the material nonwoven or the material fiber cake;
 the improving medium is sprayed under pressure by means of at least one application nozzle onto the upper side and/or underside of the sheet-like material, the material nonwoven or the material fiber cake and penetrates into the sheet-like material, the material nonwoven or the material fiber cake,
 a frame, in which a plurality of the application nozzles are arranged, is pressed onto the upper side of the material nonwoven or the material fiber cake;
 improving medium escaping on the underside of the material nonwoven or the material fiber cake is collected and carried away; and
 the improving medium is collected and carried away by means of a perforated plate or a screen.

12. The method as claimed in claim 1, wherein at least the underside of the sheet-like material is cleaned after the pressing-in of the improving medium.

13. The method as claimed in claim 1, wherein the negative pressure is varied in its intensity and/or its variation over time.

14. The method as claimed in claim 1, wherein a total amount of the improving medium is applied in one application.

15. The method as claimed in claim 1, wherein the total amount of the improving medium is applied in a number of small partial amounts.

16. A method for influencing the technological properties of individual regions of a sheet-like material comprising:
 a) fixing the sheet-like material or a pre-compacted material nonwoven or a material fiber cake on a workbench,
 b) placing at least one applicator on an upper side and/or the underside of the sheet-like material, the material nonwoven or the material fiber cake,
 c) specifically moving the at least one applicator on the upper side and/or the underside and pressing an improving medium into partial regions of the sheet-like material, the material nonwoven or the material fiber cake in a predetermined amount and under a predetermined pressure, and
 d) optionally, subsequently compressing the pre-compacted material nonwoven or the material fiber cake to form a sheet of the desired thickness,
 wherein the at least one applicator is sealed off with respect to the upper side and/or underside of the sheet-like material, the material nonwoven or the material fiber cake,
 wherein the improving medium is applied to the upper side and/or underside of the sheet-like material, the material nonwoven or the material fiber cake by means of at least one application nozzle surrounded by a housing, in that the housing rests in a sealing manner on the upper side and/or the underside of the sheet-like material, the material nonwoven or the material fiber cake and positive pressure is introduced into the housing and the improving medium thereby penetrates into the sheet-like material, the material nonwoven or the material fiber cake, and
 wherein the positive pressure is kept constant.

17. A method for influencing the technological properties of individual regions of a sheet-like material comprising:
 a) fixing the sheet-like material or a pre-compacted material nonwoven or a material fiber cake on a workbench,
 b) placing at least one applicator on an upper side and/or the underside of the sheet-like material, the material nonwoven or the material fiber cake,
 c) specifically moving the at least one applicator on the upper side and/or the underside and pressing an improving medium into partial regions of the sheet-like material, the material nonwoven or the material fiber cake in a predetermined amount and under a predetermined pressure, and
 d) optionally, subsequently compressing the pre-compacted material nonwoven or the material fiber cake to form a sheet of the desired thickness,
 wherein the at least one applicator is sealed off with respect to the upper side and/or underside of the sheet-like material, the material nonwoven or the material fiber cake,
 wherein the improving medium is applied to the upper side and/or underside of the sheet-like material, the material nonwoven or the material fiber cake by means of at least one application nozzle surrounded by a housing, in that the housing rests in a sealing manner on the upper side and/or the underside of the sheet-like material, the material nonwoven or the material fiber cake and positive pressure is introduced into the housing and the improving medium thereby penetrates into the sheet-like material, the material nonwoven or the material fiber cake, and
 wherein the positive pressure is set with a predetermined gradient.

18. The method as claimed in claim 17, wherein the gradient is increasing.

19. The method as claimed in claim 1, wherein the at least one applicator is in contact with the upper side and/or the underside of the sheet-like material, the material nonwoven or the material fiber cake.

20. A method for influencing the technological properties of individual regions of a sheet-like material comprising:
   a) fixing the sheet-like material or a pre-compacted material nonwoven or a material fiber cake on a workbench,
   b) placing at least one applicator on an upper side and/or the underside of the sheet-like material, the material nonwoven or the material fiber cake,
   c) specifically moving the at least one applicator on the upper side and/or the underside and pressing an improving medium into partial regions of the sheet-like material, the material nonwoven or the material fiber cake in a predetermined amount and under a predetermined pressure, and
   d) optionally, subsequently compressing the pre-compacted material nonwoven or the material fiber cake to form a sheet of the desired thickness,
   wherein the at least one applicator includes a plurality of application nozzles pressed onto the upper side of the sheet-like material, the material nonwoven or the material fiber cake.

21. A method for influencing the technological properties of individual regions of a sheet-like material comprising:
   a) fixing the sheet-like material or a pre-compacted material nonwoven or a material fiber cake on a workbench,
   b) placing at least one applicator on an upper side and/or the underside of the sheet-like material, the material nonwoven or the material fiber cake,
   c) specifically moving the at least one applicator on the upper side and/or the underside and pressing an improving medium into partial regions of the sheet-like material, the material nonwoven or the material fiber cake in a predetermined amount and under a predetermined pressure, and
   d) optionally, subsequently compressing the pre-compacted material nonwoven or the material fiber cake to form a sheet of the desired thickness,
   wherein the improving medium is collected and carried away by means of a perforated plate or a screen.

22. The method as claimed in claim 1, wherein the improving medium penetrates into the sheet-like material, the material nonwoven or the material fiber cake by a positive pressure.

\* \* \* \* \*

UNITED STATES PATENT AND TRADEMARK OFFICE
CERTIFICATE OF CORRECTION

PATENT NO. : 9,969,101 B2
APPLICATION NO. : 13/978076
DATED : May 15, 2018
INVENTOR(S) : Norbert Kalwa et al.

It is certified that error appears in the above-identified patent and that said Letters Patent is hereby corrected as shown below:

On the Title Page

Column 1, item (73) after "Kalkara (MT)" insert as a second Assignee --CEFLA DEUTSCHLAND GMBH, Meckenheim (DE)--

Signed and Sealed this
Sixteenth Day of July, 2024

Katherine Kelly Vidal
*Director of the United States Patent and Trademark Office*